(12) United States Patent
Ishikawa et al.

(10) Patent No.: US 10,486,731 B2
(45) Date of Patent: Nov. 26, 2019

(54) STEERING APPARATUS

(71) Applicant: YAMADA MANUFACTURING CO., LTD., Kiryu-shi, Gunma (JP)

(72) Inventors: Tomoya Ishikawa, Kiryu (JP); Katsutoshi Tsuji, Kiryu (JP)

(73) Assignee: YAMADA MANUFACTURING CO., LTD., Kiryu-Shi (JP)

( * ) Notice: Subject to any disclaimer, the term of this patent is extended or adjusted under 35 U.S.C. 154(b) by 0 days.

(21) Appl. No.: 16/055,481

(22) Filed: Aug. 6, 2018

(65) Prior Publication Data

US 2019/0047608 A1   Feb. 14, 2019

(30) Foreign Application Priority Data

Aug. 9, 2017   (JP) .................................. 2017-154000

(51) Int. Cl.
*B62D 1/184*   (2006.01)
*B62D 1/185*   (2006.01)

(52) U.S. Cl.
CPC ............ *B62D 1/185* (2013.01); *B62D 1/184* (2013.01)

(58) Field of Classification Search
CPC ................................ B62D 1/184; B62D 1/185
See application file for complete search history.

(56) References Cited

U.S. PATENT DOCUMENTS

| | | | | |
|---|---|---|---|---|
| 7,717,011 B2 * | 5/2010 | Hirooka | ................ | B62D 1/184 280/777 |
| 7,954,852 B2 * | 6/2011 | Ueno | ...................... | B62D 1/16 280/775 |
| 8,826,767 B2 * | 9/2014 | Maniwa | ................ | B62D 1/184 280/775 |
| 8,826,769 B2 * | 9/2014 | Takezawa | .............. | B62D 1/189 280/776 |
| 8,984,984 B2 * | 3/2015 | Yokota | ..................... | B62D 1/18 280/775 |
| 9,540,034 B2 * | 1/2017 | Takahashi | .............. | B62D 1/184 |
| 9,802,637 B2 * | 10/2017 | Takahashi | .............. | B62D 1/189 |
| 2012/0080874 A1 * | 4/2012 | Narita | .................... | B62D 1/184 280/777 |
| 2016/0039450 A1 * | 2/2016 | Johta | ...................... | B62D 1/184 74/493 |
| 2016/0167695 A1 * | 6/2016 | Hagiwara | .............. | B62D 1/184 74/493 |
| 2016/0272235 A1 * | 9/2016 | Takahashi | .............. | B62D 1/184 |
| 2016/0280159 A1 * | 9/2016 | Kakita | .................. | B60R 16/027 |
| 2016/0311459 A1 | 10/2016 | Takahashi et al. | | |
| 2017/0282960 A1 * | 10/2017 | Matsuno | ................ | B62D 1/184 |

FOREIGN PATENT DOCUMENTS

JP   2016-203911   12/2016

* cited by examiner

*Primary Examiner* — Barry Gooden, Jr.
(74) *Attorney, Agent, or Firm* — Rankin, Hill & Clark LLP

(57) ABSTRACT

A stopper bracket (40) is fixed to an inner pipe (13) at a location between the pair of clamp parts (23 and 23). The hanger bracket (50) is assembled with the stopper bracket (40), and a pair of side plates (51 and 51) of the hanger bracket (50) are interposed between the pair of clamp parts (23 and 23) and the pair of outer column support parts (11*a* and 11*a*). The guide mechanism (60) guides the hanger bracket (50) so that the hanger bracket (50) is restricted from displacing relative to the stopper bracket (40) in a front-rear direction of a vehicle and is capable of displacing relative to the stopper bracket (40) in a vehicle width direction. A support mechanism (70) supports the hanger bracket (50) relative to the stopper bracket (40).

4 Claims, 11 Drawing Sheets

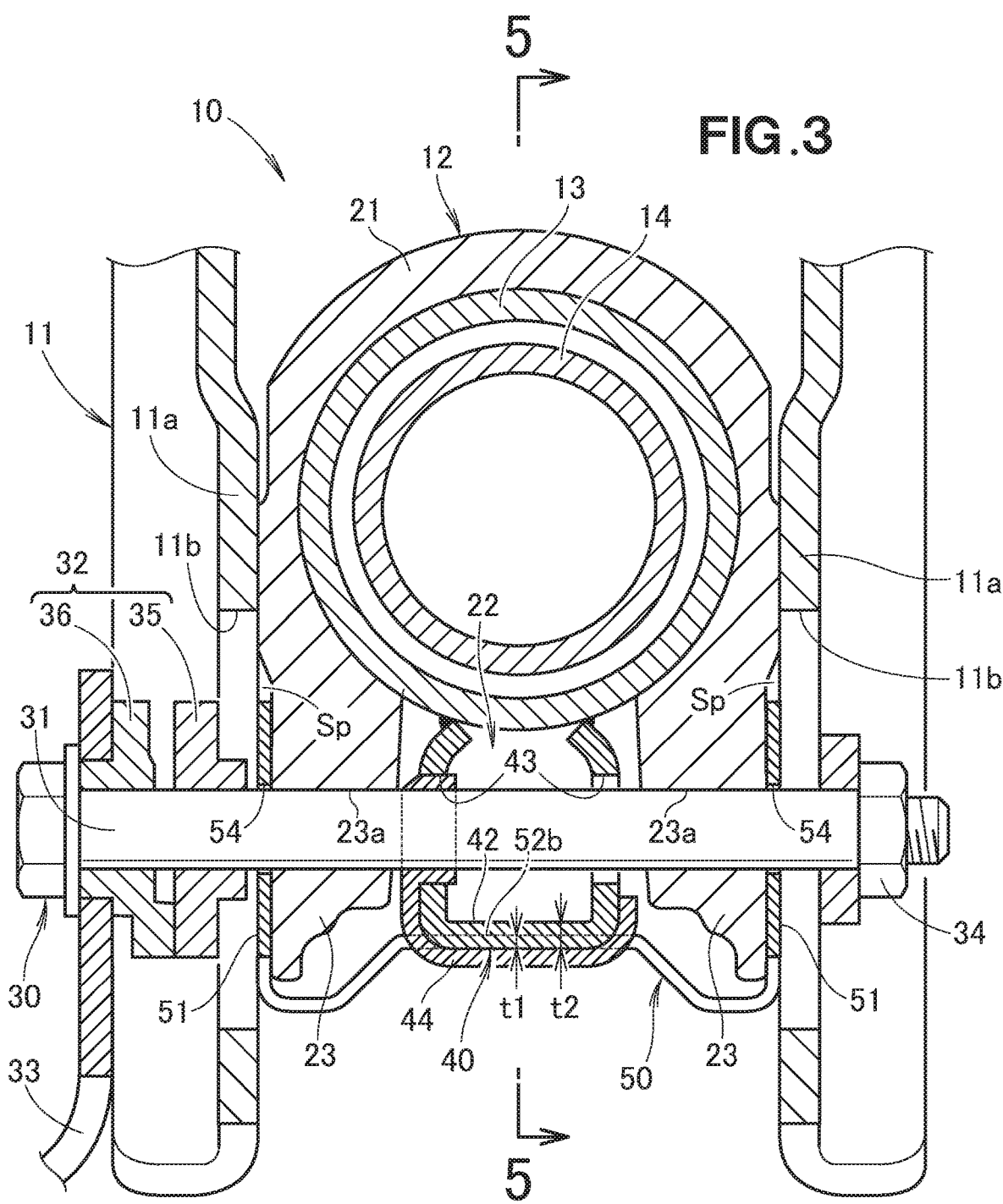
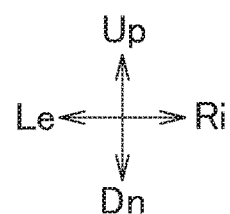
FIG.3

FIG.11
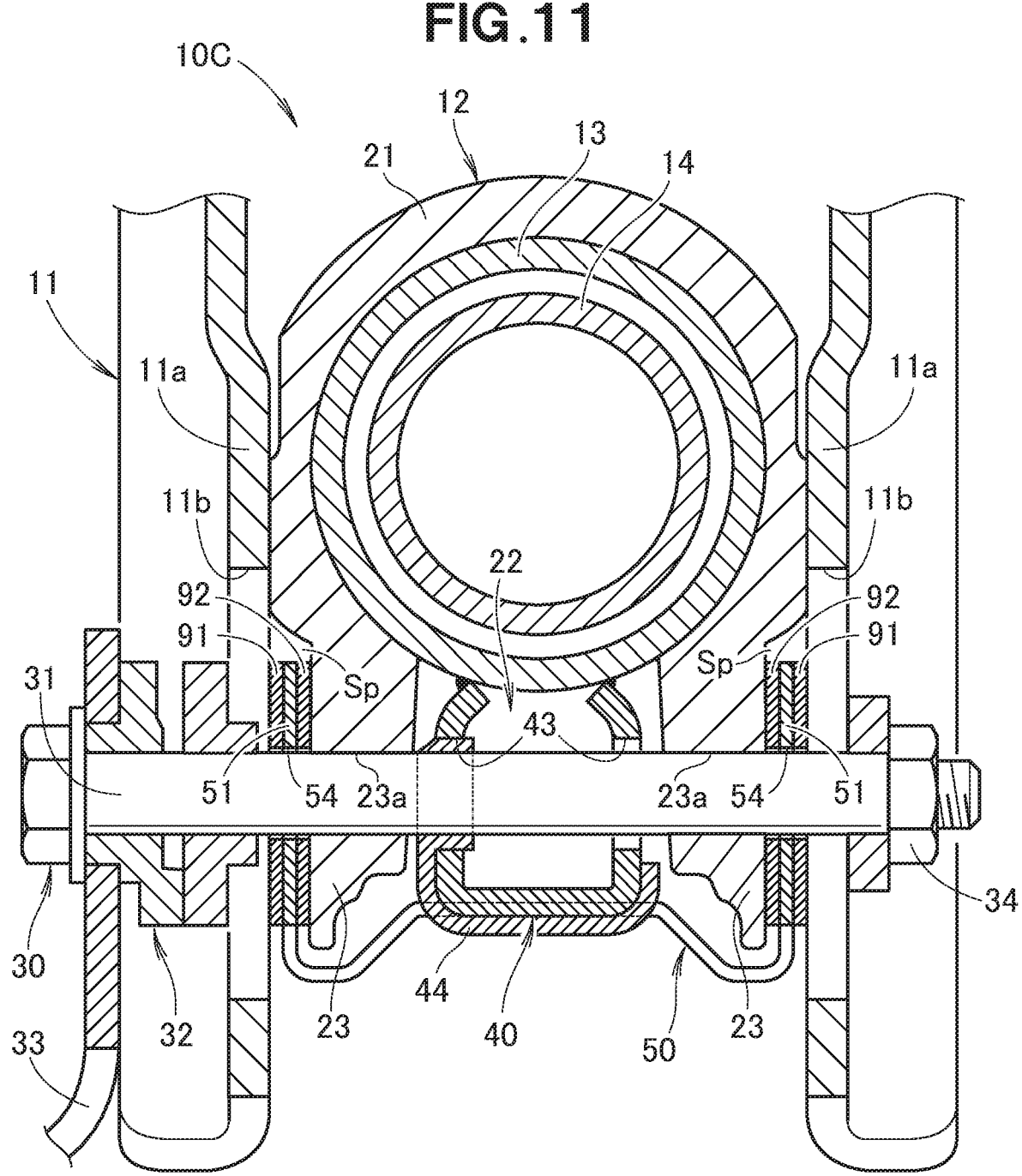
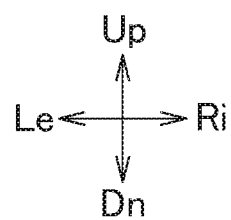

STEERING APPARATUS

TECHNICAL FIELD

The steering apparatus including a telescopic adjustment mechanism.

BACKGROUND

Vehicles are driven by drivers having a variety of physiques. In recent years, steering apparatuses including telescopic adjustment mechanisms, through which the position of the steering wheel can be adjusted forward and rearward (known as "telescopic adjustment") to accommodate the physiques of various drivers, have been known. A steering apparatus disclosed in JP 2016-203911 A includes an outer column, which holds an inner pipe disposed within a steering shaft so as to be capable of moving in a front-rear direction of the vehicle or being fixed.

With the steering apparatus of JP 2016-203911 A, the outer column is attached to a vehicle body using a vehicle body attachment bracket. This outer column includes a pair of clamp parts that hold the inner pipe so as to be capable of moving in the front-rear direction of the vehicle or being fixed. A fixing bracket includes a pair of outer column support parts that enclose the pair of clamp parts from both sides in a vehicle width direction. The pair of clamp parts and the pair of outer column support parts are tightened down by a lock lever through which a clamp bolt is passed.

The inner pipe is provided with a bracket that restricts a range of telescopic adjustment. This bracket includes a stopper bracket welded to the inner pipe, and a hanger bracket bolted to the stopper bracket in the center with respect to the vehicle width. The hanger bracket includes a pair of side plates, and front and rear linking pieces that connect bottom ends of the pair of side plates to each other. The pair of side plates are interposed between the pair of clamp parts and the pair of outer column support parts. This increases the rigidity of the steering apparatus and the holding force when tightened in the telescoping direction.

As described above, the hanger bracket is bolted to the stopper bracket at the center with respect to the vehicle width, and thus displaces neither in the vehicle width direction nor in the up-down direction relative to the stopper bracket. It would be more desirable, however, if when the driver finishes the telescopic adjustment operation and tightens the lock lever, the linking pieces connecting the bottom ends of the pair of side plates to each other do not produce resistance against the operation of tightening the lock lever.

SUMMARY

An object is to provide a steering apparatus that improves the ease of assembly and has favorable telescopic operability in a steering apparatus including a telescopic adjustment mechanism.

According to claim 1, a steering apparatus includes: an inner pipe rotatably supporting a steering shaft, the steering shaft being disposed within the inner pipe; an outer column including a pair of clamp parts holding the inner pipe such that the inner pipe can move in a front-rear direction of a vehicle and can be fixed; a vehicle body attachment bracket including a pair of outer column support parts that enclose the pair of clamp parts from both sides in a width direction, the vehicle body attachment bracket being attachable to a vehicle body; a fastening mechanism including a clamp bolt capable of tightening the inner pipe through the pair of clamp parts and the pair of outer column support parts; a stopper bracket fixed to the inner pipe and located between the pair of clamp parts; and a hanger bracket capable of being assembled onto a lower end of the stopper bracket. The hanger bracket includes a pair of side plates, a telescopic adjustment long hole being formed in each of the pair of side plates, and the pair of side plates being interposed between the pair of clamp parts and the pair of outer column support parts. The steering apparatus further includes: a guide mechanism configured to guide the hanger bracket such that the hanger bracket is restricted from displacing relative to the stopper bracket in the front-rear direction of the vehicle but is capable of displacing relative to the stopper bracket in a vehicle width direction; and a support mechanism configured to support the hanger bracket relative to the stopper bracket.

As described in claim 2, preferably, the support mechanism includes a retaining part configured to retain a state of the hanger bracket being restricted from displacing relative to the stopper bracket in the front-rear direction of the vehicle using the guide mechanism.

As described in claim 3, preferably, the support mechanism includes: a groove located in a lower surface of the stopper bracket and penetrating in the vehicle width direction; a fitting piece of the hanger bracket, the fitting piece being capable of fitting with the groove to be capable of relative displacement in the vehicle width direction and restricted from relative displacement in the front-rear direction of the vehicle; and the retaining part. Here, the retaining part includes a flange part extending upward from a rear end of the fitting piece.

As described in claim 4, preferably, the support mechanism includes: a groove located in a lower surface of the stopper bracket and penetrating in the vehicle width direction; a fitting piece of the hanger bracket, the fitting piece being capable of fitting with the groove to be capable of relative displacement in the vehicle width direction but restricted from relative displacement in the front-rear direction of the vehicle; and the retaining part. Here, the retaining part includes a flange part extending downward from a front edge of the groove.

According to claim 1, the guide mechanism enables the hanger bracket to displace relative to the stopper bracket in the vehicle width direction. The support mechanism supports the hanger bracket relative to the stopper bracket. Accordingly, when the hanger bracket is assembled with the stopper bracket, the position of the hanger bracket relative to the stopper bracket can be automatically adjusted up, down, left, and right. In a case where the stopper bracket is fixed to the inner pipe by welding or the like, for example, thermal strain may arise. The various parts of the steering apparatus may have dimensional tolerances. Even in this case, the position of the hanger bracket relative to the stopper bracket is automatically adjusted up, down, left, and right, and thus thermal strain or tolerances can be compensated for. Thus, the hanger bracket can easily be assembled with the stopper bracket. Thus, ease of assembly is improved, and a favorable telescopic operability is achieved in the steering apparatus including the telescopic adjustment mechanism.

Furthermore, the hanger bracket is supported in a floating state, and capable of displacing in the vehicle width direction relative to the stopper bracket. In other words, the hanger bracket is not bolted to the stopper bracket. When the clamp bolt is tightened, the hanger bracket does not push out against the stopper bracket. Accordingly, the tightening force applied to tighten the clamp bolt is not dampened due to the brackets being bolted to each other. As such, the tightening force applied to tighten the pair of side plates can be further increased by the pair of clamp parts and the pair of outer column support parts. Increasing friction at both surfaces of the pair of side plates further ensures sufficient stable collision energy absorption performance.

Moreover, dampening of the tightening force when tightening the clamp bolt can be suppressed to a high degree. Thus, when tightening the clamp bolt, the tightening operation can be made easier.

According to claim 2, a state in which the hanger bracket is restricted from displacing in the front-rear direction of the vehicle relative to the stopper bracket can be retained by the retaining part. Thus, collision energy produced by a secondary collision can be transmitted from the stopper bracket to the hanger bracket, and the hanger bracket can sufficiently receive the collision energy. This makes it possible to maintain a desired amount of energy absorption.

According to claim 3, the retaining part can be configured easily, by the flange part extending upward from the rear end of the fitting piece of the hanger bracket.

According to claim 4, the retaining part can be configured easily, by the flange part that extends downward from the front edge of the groove, which is located in the lower surface of the stopper bracket and penetrates in the vehicle width direction.

BRIEF DESCRIPTION OF THE DRAWINGS

FIG. 3 is an enlarged view of a vicinity of a telescopic adjustment mechanism illustrated in FIG. 2.

FIG. 11 is a cross-sectional view of a steering apparatus according to a third variation of the embodiment.

DETAILED DESCRIPTION

Figure 1:
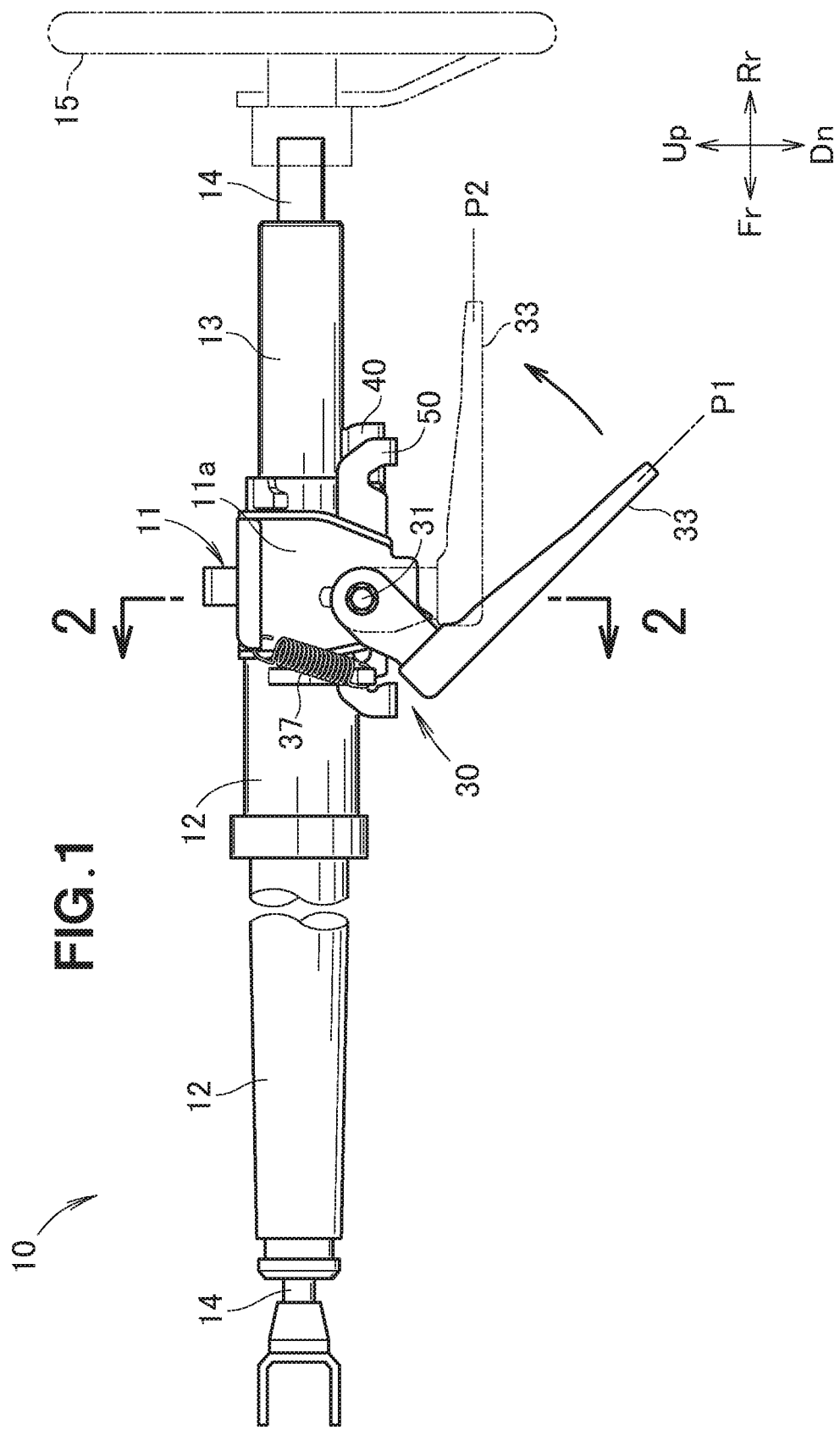
FIG. 1 is a left-side view of a steering apparatus according to the embodiment.

In the following description, for purpose of explanation, numerous specific details are set forth in order to provide a thorough understanding of disclosed embodiment. It will be apparent, however, that one or more embodiments may be practiced without these specific details. In other instances, well-known structures and devices are schematically shown in order to simplify the drawing. Embodiments will be described next on the basis of the appended drawings. In the descriptions, "left" and "right" refer to left and right from the perspective of occupants of a vehicle, whereas "front" and "rear" refer to front and rear with respect to the direction in which the vehicle travels. In the drawings, "Fr" indicates "front", "Rr" indicates "rear", "Le" indicates left from the perspective of an occupant, "Ri" indicates right from the perspective of an occupant, "Up" indicates up, and "Dn" indicates down.

EMBODIMENTS

A steering apparatus according to the embodiments will be described on the basis of FIGS. 1 to 9. As illustrated in FIG. 1, a steering apparatus 10 can be attached to a vehicle body, and has what is known as a "telescoping function". In other words, the steering apparatus 10 enables an occupant to adjust the position of a steering wheel 15 in a front-rear direction of the vehicle to accommodate the physique of the occupant, with the steering apparatus 10 attached to the vehicle body. The steering apparatus 10 can further adjust the tilt of the steering wheel 15 relative to the vehicle body in an up-down direction (tilt adjustment).

Figure 2:
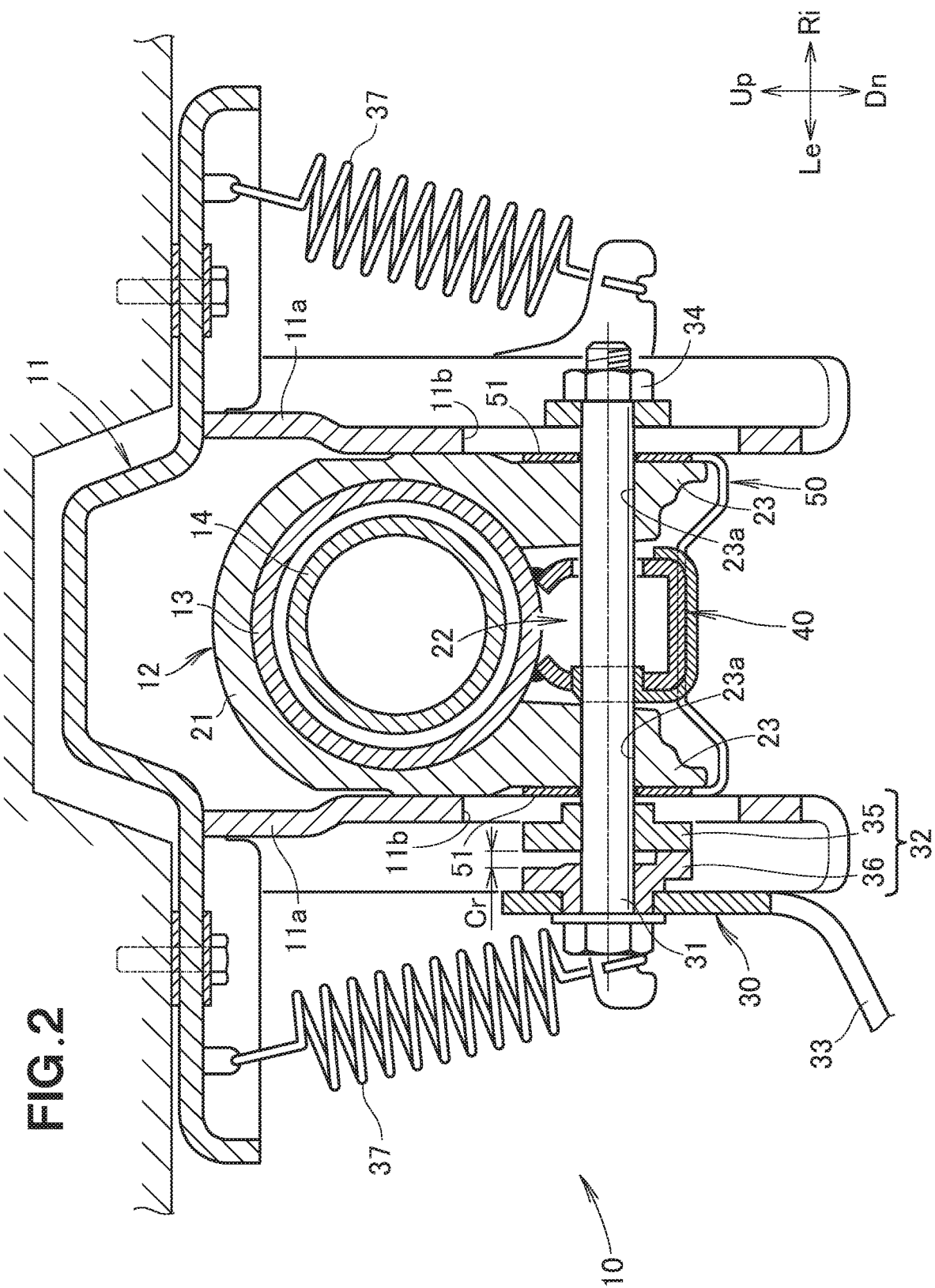
FIG. 2 is a cross-sectional view taken along a line 2-2 in FIG. 1.

As illustrated in FIGS. 1 and 2, the steering apparatus 10 includes: a vehicle body attachment bracket 11 that can be attached to the vehicle body; an outer column 12 supported by the vehicle body attachment bracket 11 so as to be capable of moving up and down (capable of pivoting); an inner pipe 13 having a cylindrical shape supported by the outer column 12 so as to be capable of moving in the front-rear direction of the vehicle and being fixed; a steering shaft 14 disposed within the inner pipe 13; and a fastening mechanism 30 capable of fastening the inner pipe 13 to the outer column 12.

Thus, the outer column 12 can be attached to the vehicle body using the vehicle body attachment bracket 11. The steering shaft 14 is rotatably supported by the outer column 12 and the inner pipe 13. A rear end of the steering shaft 14 is attached to the steering wheel 15.

As illustrated in FIG. 2, the vehicle body attachment bracket 11 includes a pair of outer column support parts 11a and 11a (side plate parts 11a and 11a) extending downward from both sides in a width direction. The pair of outer column support parts 11a and 11a are formed in flat plate shape, facing each other, and substantially parallel to each other. Long holes 11b and 11b used for tilt adjustment, which are longer in the up-down direction, are formed in the outer column support parts 11a and 11a.

The outer column 12 is formed in a substantially inverted U shape when viewed from the steering wheel 15 side (see FIG. 1). In other words, the outer column 12 is an integrally-formed component including: a pipe holding part 21 that holds the inner pipe 13 by the outer circumferential surface of the inner pipe 13; an opening 22 formed along an axial direction of the pipe holding part 21; and a pair of clamp parts 23 and 23 extending from the pipe holding part 21 on both sides of the opening 22 with respect to the width direction.

The pair of clamp parts 23 and 23 are located between the pair of outer column support parts 11a and 11a. Outer surfaces of the pair of clamp parts 23 and 23 with respect to the vehicle width direction are adjacent to inner surfaces of the pair of outer column support parts 11a and 11a with respect to the vehicle width direction. The pair of outer column support parts 11a and 11a can enclose the pair of clamp parts 23 and 23 from both sides in the width direction. The pair of clamp parts 23 and 23 further include a pair of bolt passage holes 23a and 23a penetrating the clamp parts 23 and 23 in the vehicle width direction.

The pair of clamp parts 23 and 23 can be fastened to each other by the fastening mechanism 30. The fastening mechanism 30 includes a clamp bolt 31, a fastening cam 32, an operating lever 33, and a nut 34.

The clamp bolt 31 penetrates the long holes 11b and 11b of the pair of outer column support parts 11a and 11a and the bolt passage holes 23a and 23a of the pair of clamp parts 23 and 23. The outer column 12 is supported on the vehicle body attachment bracket 11 by the clamp bolt 31. The clamp bolt 31 is capable of tightening the inner pipe 13 through the pair of clamp parts 23 and 23 and the pair of outer column support parts 11a and 11a.

The fastening cam 32 and the operating lever 33 are located on the outer side, with respect to the vehicle width direction, of one of the pair of outer column support parts 11a and 11a, e.g., the outer column support part 11a on the left when viewed from the steering wheel 15 side. The nut 34 is positioned on the other outer side, with respect to the vehicle width direction, and is screwed onto the clamp bolt 31.

The fastening cam 32 includes a fixed cam 35 and a mobile cam 36, which face each other. Cam ridges are formed in opposing surfaces of the fixed cam 35 and the mobile cam 36 which face each other. The fixed cam 35 is fitted with the long hole 11b in the outer column support part 11a on the left when viewed from the steering wheel 15 side, so as to be capable of sliding up and down but restricted from rotating. The clamp bolt 31 penetrates the fixed cam 35. The mobile cam 36 is fitted with the operating lever 33.

The operating lever 33 is an operating member that rotationally operates the clamp bolt 31. This operating lever 33 is attached to the clamp bolt 31 so as to be capable of rotating along with the mobile cam 36.

When the operating lever 33 is in a movement position P1 indicated by the solid line in FIG. 1, the fixed cam 35 and the mobile cam 36 illustrated in FIG. 2 are close to each other, and a gap Cr is narrow. As a result, the fixing of the inner pipe 13 by the pipe holding part 21 is released, and the inner pipe 13 can be displaced in the front-rear direction of the vehicle. Thus, by turning the clamp bolt 31 in one direction and loosening the fastening mechanism 30, a mobile mode can be set in which the position of the inner pipe 13 in the front-rear direction of the vehicle, relative to the outer column 12, can be adjusted.

Then, by rotationally operating the operating lever 33 in the counterclockwise direction in FIG. 1 and switching the operating lever 33 to a restricted position P2 indicated by the double-dot-dash line, the fixed cam 35 and the mobile cam 36 separate and the gap Cr widens. The pair of clamp parts 23 and 23 are compressed by the pair of outer column support parts 11a and 11a tightened by the fixed cam 35 and the nut 34, and deform so as to approach each other. Thus, by turning the clamp bolt 31 in the other direction and tightening the fastening mechanism 30, a restricted mode can be set in which movement of the inner pipe 13 in the front-rear direction of the vehicle, relative to the outer column 12, is restricted.

The outer column 12 is suspended from both sides of the vehicle body attachment bracket 11 with respect to the vehicle width direction by a pair of tension springs 37 and 37. When the clamp bolt 31 is loosened using the operating lever 33, the pair of tension springs 37 and 37 hold the outer column 12 through biasing force.

As is clear from the foregoing descriptions, the fastening mechanism 30 can switch the state of holding of the inner pipe 13 by the outer column 12 between the mobile mode and the restricted mode. In other words, the fastening mechanism 30 switches between a permitted state in which the inner pipe 13 is permitted to move in a lengthwise direction relative to the outer column 12, and a restricted state in which such movement is restricted. In the restricted mode, the inner pipe 13 is held by friction with the outer column 12. Thus, the inner pipe 13 is held by the outer column 12 so as to be capable of moving in the front-rear direction of the vehicle and being fixed.

Figure 4:
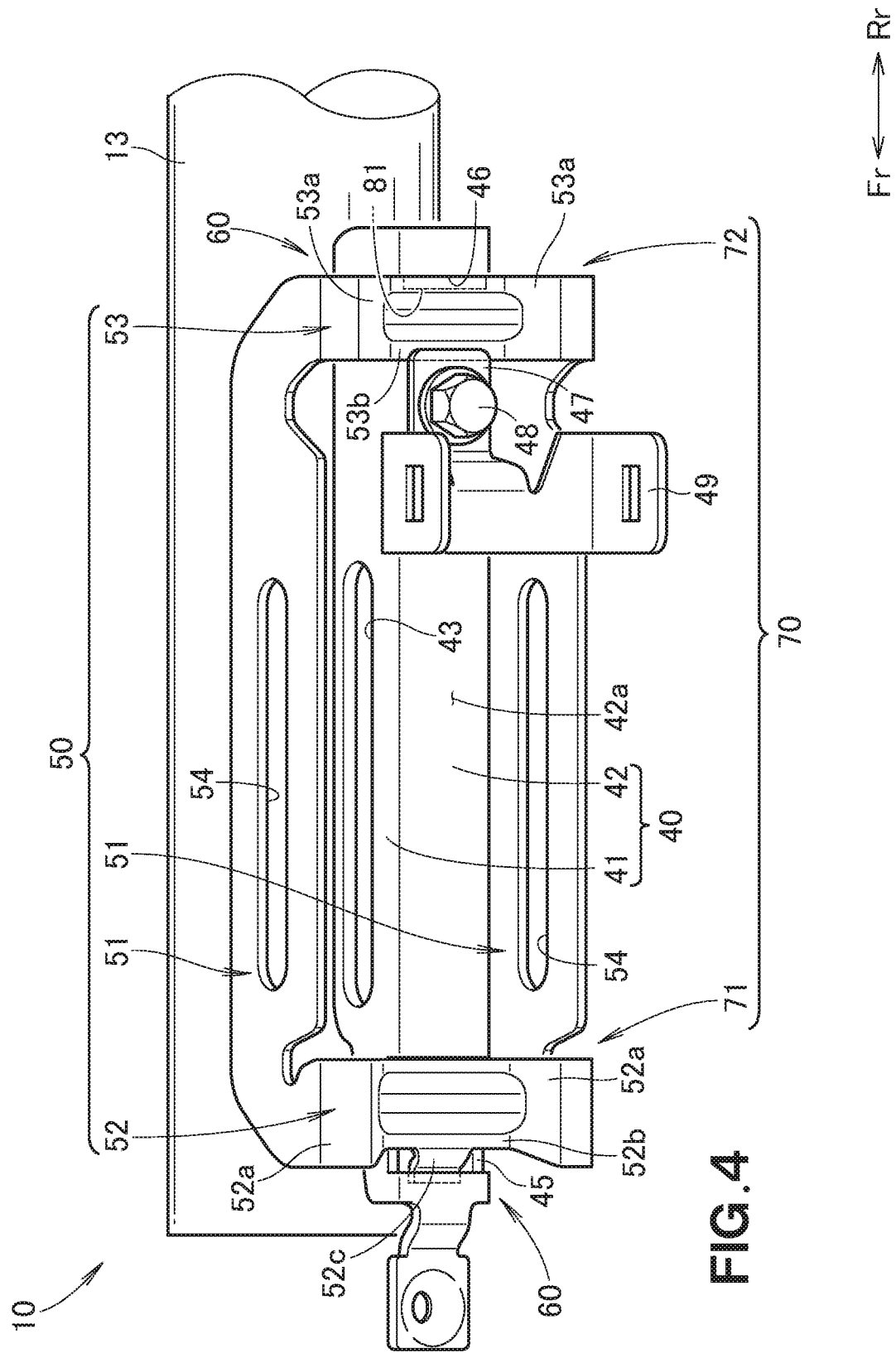
FIG. 4 is a perspective view illustrating a combined structure of a stopper bracket and a hanger bracket, illustrated in FIG. 3, viewed from below.

Furthermore, the steering apparatus 10 includes a stopper bracket 40, a hanger bracket 50, a guide mechanism 60, and a support mechanism 70, as illustrated in FIGS. 3 and 4.

Figure 5:
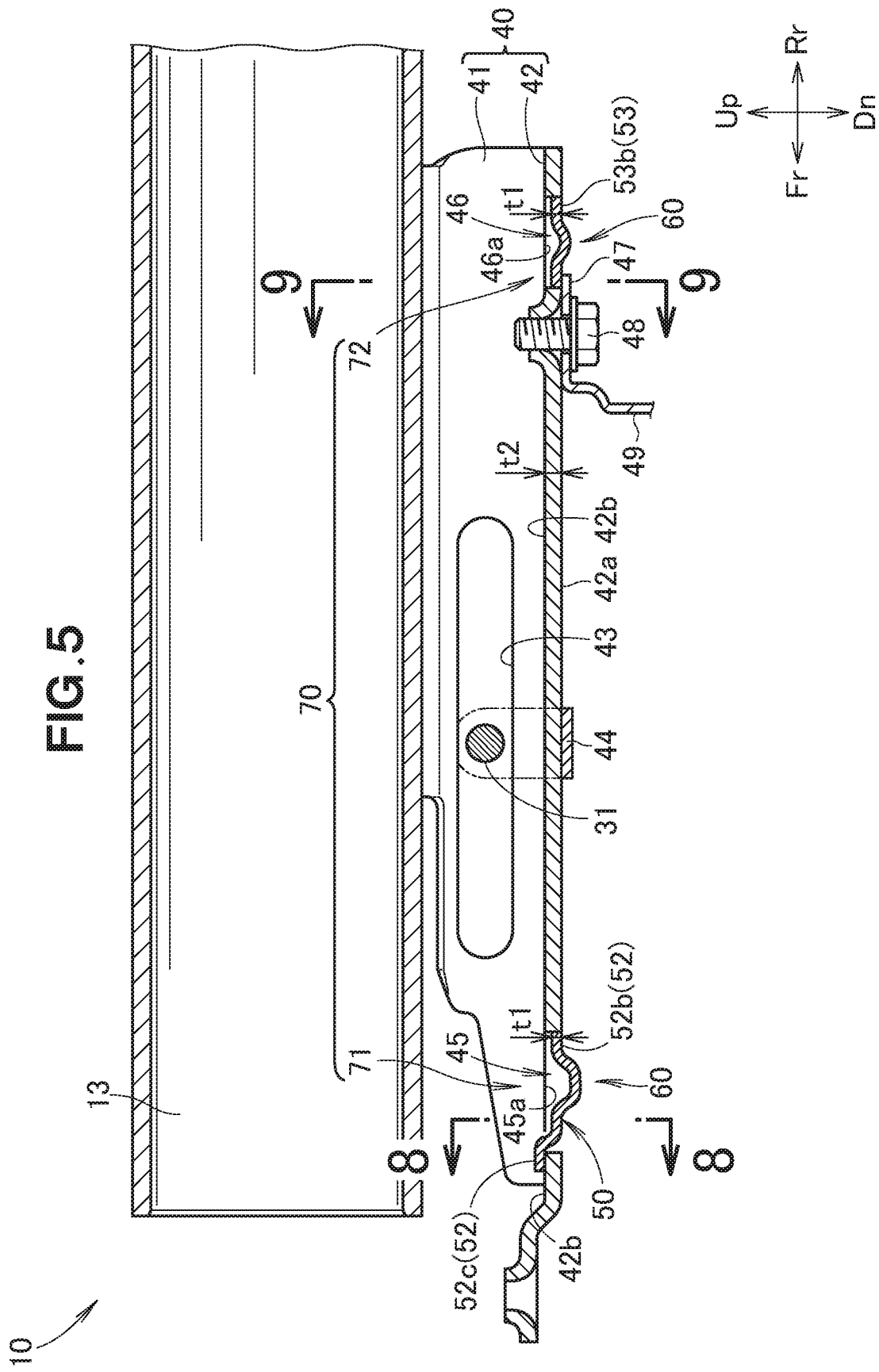
FIG. 5 is a cross-sectional view taken along a line 5-5 in FIG. 3.
Figure 6:
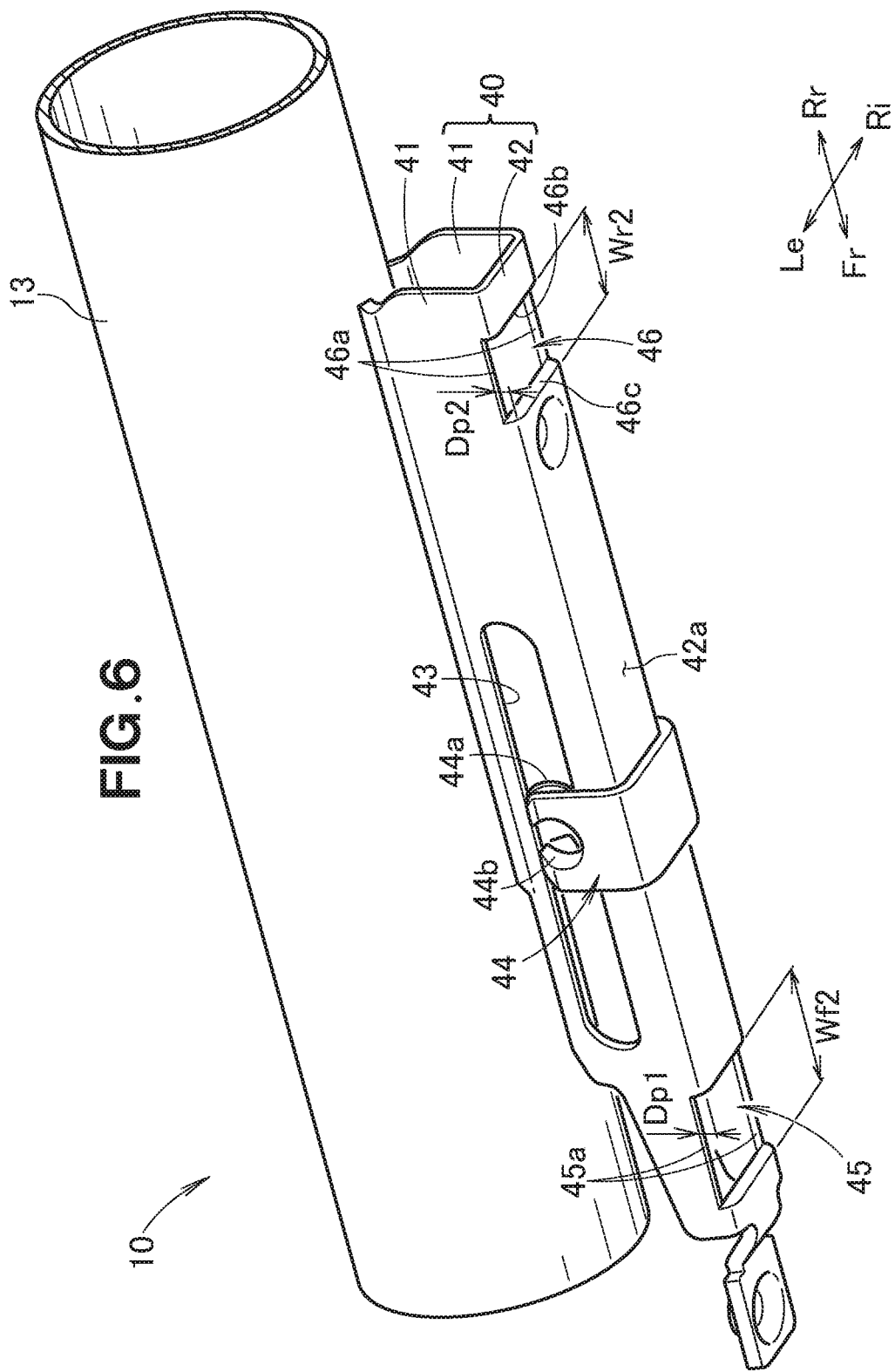
FIG. 6 is a perspective view illustrating a structure for assembling an inner pipe and the stopper bracket, illustrated in FIG. 5, viewed from below.

As illustrated in FIGS. 3, 5, and 6, the stopper bracket 40 is welded and fixed to the inner pipe 13, and is located between the pair of clamp parts 23 and 23. More specifically, the stopper bracket 40 extends radially outward from the inner pipe 13, is located between the pair of clamp parts 23 and 23, and is longer in the lengthwise direction of the inner pipe 13. The stopper bracket 40 is a molded component formed by bending a metal sheet, has a substantially U-shaped cross-section when viewed from the steering wheel 15 side (see FIG. 1), and is bonded to the outer circumferential surface of the inner pipe 13 at the open end of the U. The stopper bracket 40 having a substantially U-shaped cross-section includes a pair of extension plates 41 and 41 having a flat plate shape distanced from each other with respect to the lengthwise direction of the clamp bolt 31 and face each other, and a base plate 42 having a flat plate and constitutes the base of the substantially U-shaped cross-section.

The stopper bracket 40 includes a pair of telescopic adjustment long holes 43 and 43 through which the clamp bolt 31 can be passed. The pair of telescopic adjustment long holes 43 and 43 are formed in corresponding ones of the pair of extension plates 41 and 41, and are longer in the lengthwise direction of the inner pipe 13.

A slider 44 is fitted over the outer circumferential surface of the stopper bracket 40. Specifically, this slider 44 is a molded component made from a resin that contacts one extension plates 41 of the pair of extension plates 41 and 41 and the base plate 42, and is capable of sliding. The slider 44 includes a slider head 44a that is fitted into the telescopic adjustment long hole 43 and is capable of displacing relative to the telescopic adjustment long hole 43. An insertion hole 44b through which the clamp bolt 31 can be passed is formed in the slider head 44a.

The inner pipe 13 and the stopper bracket 40 can displace relative to the slider 44 and the clamp bolt 31 within a range corresponding to the length of the telescopic adjustment long hole 43. The range of the telescopic adjustment is determined by the amount of relative displacement that is possible between the telescopic adjustment long hole 43 and the slider head 44a. As illustrated in FIG. 1, when the operating lever 33 is in the mobile mode, which corresponds to the movement position P1, the slider 44 can slide relative to the telescopic adjustment long hole 43. Accordingly, the range through which the inner pipe 13 can move in the mobile mode is a range at which both ends of the telescopic adjustment long hole 43 in the lengthwise direction contact the slider head 44a. The slider 44 is made of resin, and thus noise produced when the slider 44 contacts the front end or the rear end of the telescopic adjustment long hole 43 can be suppressed.

As illustrated in FIG. 6, front and rear grooves 45 and 46, which extend in the vehicle width direction, are formed on both sides of the stopper bracket 40 with respect to the lengthwise direction. The front and rear grooves 45 and 46 are formed by cutting out, in the width direction, parts, in the lengthwise direction, of the base plate 42 of the stopper bracket 40. The front and rear grooves 45 and 46 penetrate the stopper bracket 40 in the vehicle width direction, and also penetrate upward and downward. The front and rear grooves 45 and 46 may be recesses that do not penetrate the stopper bracket 40 in the up-down direction.

As illustrated in FIGS. 3 to 5 and 7, the hanger bracket 50 can be attached to a bottom end of the stopper bracket 40, and is longer in the lengthwise direction of the stopper bracket 40. The hanger bracket 50 is a molded component formed by bending a metal sheet, and includes a pair of side plates 51 and 51, and front and rear linking pieces 52 and 53 that connect bottom ends of the side plates 51 and 51 to each other.

The pair of side plates 51 and 51 are flat plates, separated from each other with respect to the lengthwise direction of the clamp bolt 31 and facing each other, and are mounted to the stopper bracket 40 so as to be interposed between the pair of clamp parts 23 and 23 and the pair of outer column support parts 11a and 11a. Specifically, there are pre-set constant gaps Sp and Sp between the inner surfaces, in the vehicle width direction, of the pair of outer column support parts 11a and 11a, and the outer surfaces, in the vehicle width direction, of the pair of clamp parts 23 and 23 (see FIG. 3). The pair of side plates 51 and 51 are present within these left and right gaps Sp and Sp. To be more specific, when in the mobile mode, the pair of side plates 51 and 51 are capable of a slight amount of displacement in the vehicle width direction within the left and right gaps Sp and Sp.

Furthermore, the pair of side plates 51 and 51 include a pair of telescopic adjustment long holes 54 and 54 (see FIG. 4). The clamp bolt 31 can be passed through the pair of telescopic adjustment long holes 54 and 54, which are longer in the lengthwise direction of the inner pipe 13. The length of the pair of telescopic adjustment long holes 54 and 54 is set to be greater than or equal to the length of the telescopic adjustment long holes 43 and 43 in the stopper bracket 40.

The front and rear linking pieces 52 and 53 have arch shapes when viewed in the lengthwise direction (the front-rear direction of the vehicle) of the hanger bracket 50.

The front linking piece 52 connects the front ends of the pair of side plates 51 and 51 to each other. The front linking piece 52 includes a pair of inclined parts 52a and 52a extending diagonally upward from the bottom ends of the pair of side plates 51 and 51 toward the widthwise center of the hanger bracket 50, and a substantially horizontal upper part 52b that connects the upper ends of the inclined parts 52a and 52a.

The rear linking piece 53 connects the rear ends of the pair of side plates 51 and 51 to each other. The rear linking piece 53 includes a pair of inclined parts 53a and 53a extending diagonally upward from the bottom ends of the pair of side plates 51 and 51 toward the widthwise center of the hanger bracket 50, and a substantially horizontal upper part 53b that connects the upper ends of the inclined parts 53a and 53a.

Figure 7:
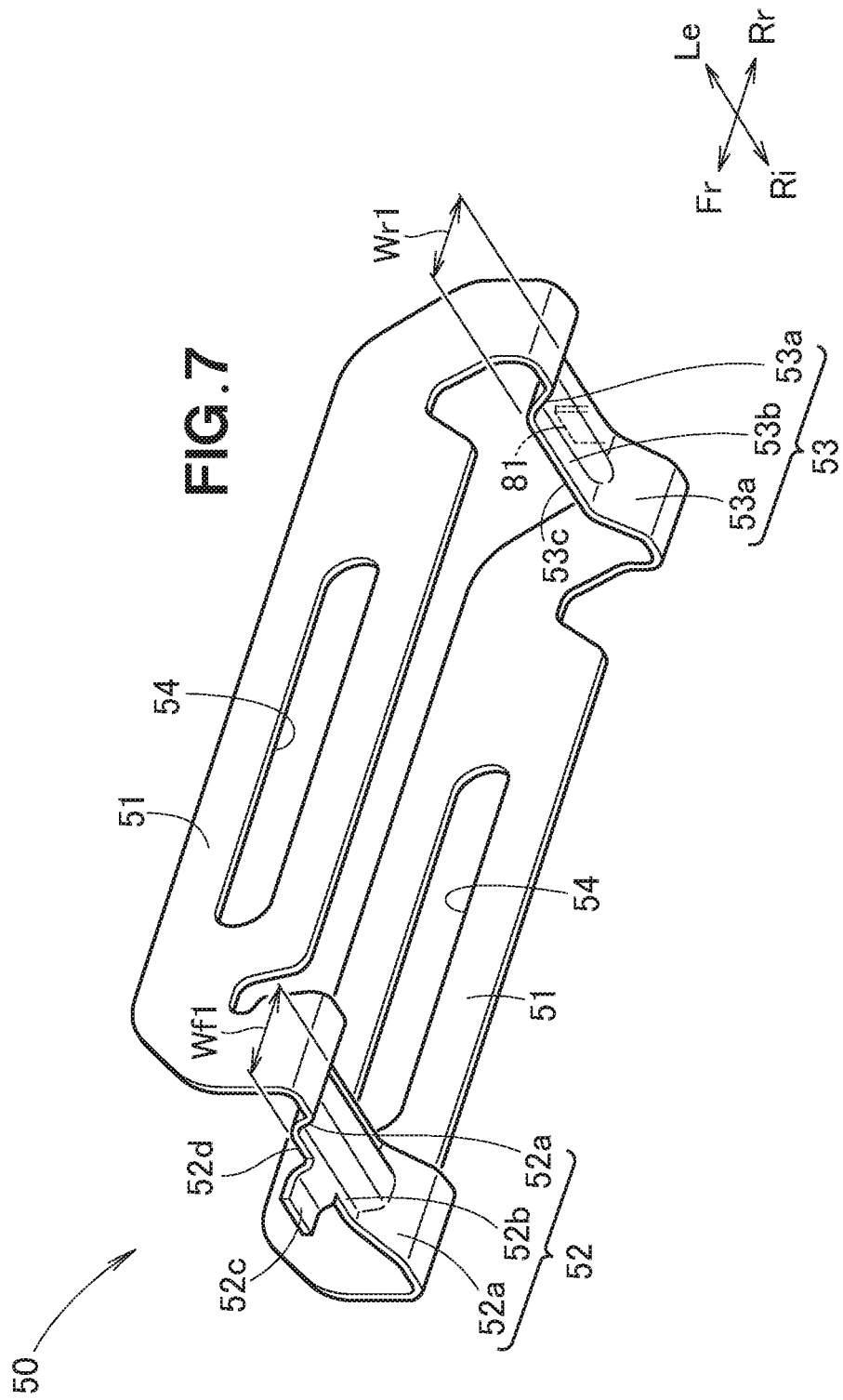
FIG. 7 is a perspective view of the hanger bracket illustrated in FIG. 4.

As illustrated in FIGS. 6 and 7, a front-rear direction width Wf1 of the upper part 52b of the front linking piece 52 is slightly smaller than a front-rear direction groove width Wf2 of the front groove 45 in the stopper bracket 40 (Wf1<Wf2). A front-rear direction width Wr1 of the upper part 53b of the rear linking piece 53 is slightly smaller than a front-rear direction groove width Wr2 of the rear groove 46 in the stopper bracket 40 (Wr1<Wr2). The upper part 52b of the front linking piece 52 is fitted into the front groove 45 so as to be capable of relatively displacing in the vehicle width direction. The front linking piece 52 is restricted from displacing relative to the front groove 45 in the front-rear direction of the vehicle. On the other hand, the upper part 53b of the rear linking piece 53 is fitted into the rear groove 46 so as to be capable of relatively displacing in the vehicle width direction. The rear linking piece 53 is restricted from displacing relative to the rear groove 46 in the front-rear direction of the vehicle.

As described above, the front linking piece 52 includes the pair of inclined parts 52a and 52a between the lower ends of the pair of side plates 51 and 51 and the upper part 52b. The rear linking piece 53 includes the pair of inclined parts 53a and 53a between the lower ends of the pair of side plates 51 and 51 and the upper part 53b. The inclined parts 52a and 52a and the inclined parts 53a and 53a elastically deform with ease toward the vehicle widthwise center when an outside force is exerted on the side plates 51 and 51 of the hanger bracket 50 in the vehicle width direction. The same applies to the pair of inclined parts 53a and 53a. As such, the pair of side plates 51 and 51 elastically deform with ease toward the vehicle widthwise center under an outside force in the vehicle width direction.

As illustrated in FIGS. 4, 5, and 7, the upper part 52b of the front linking piece 52 includes a claw part 52c. The claw part 52c is located in the widthwise center of the hanger bracket 50, and extends forward and upward, in a stepped shape, from the front end of the upper part 52b. In a state where the front linking piece 52 is fitted into the front groove 45, the claw part 52c rests on an upper surface 42b of the base plate 42 of the stopper bracket 40 (see FIG. 5). Accordingly, the front linking piece 52 does not fall from the front groove 45.

Figure 8:
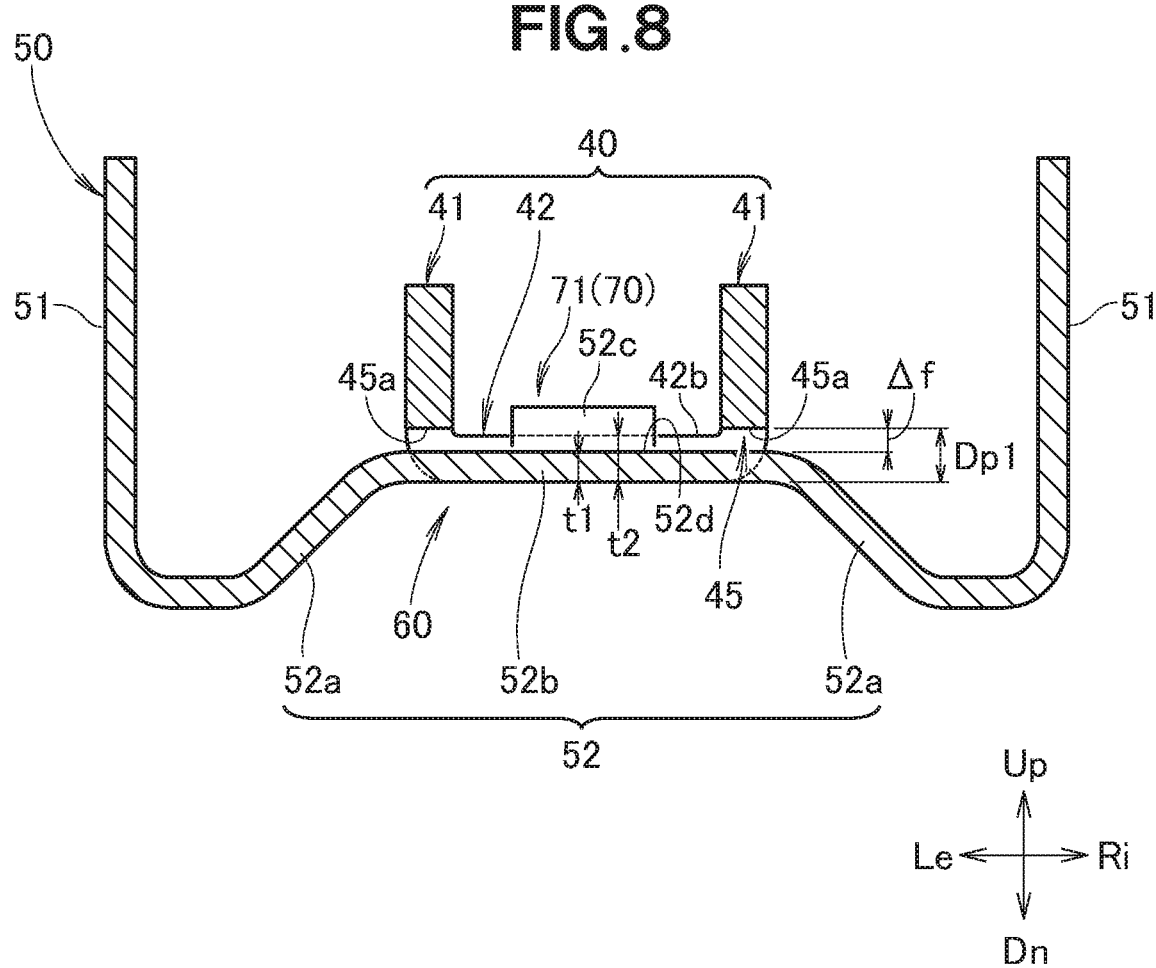
FIG. 8 is a cross-sectional view taken along a line 8-8 in FIG. 5.

As illustrated in FIG. 8, in a state where the claw part 52c is resting on the upper surface 42b of the base plate 42, a size $\Delta f$ of a height (gap) from an upper surface 52d of the upper part 52b to a base surface 45a of the front groove 45 will be called a "size $\Delta f$ of a front-side gap" hereinafter. The front linking piece 52 is permitted to displace relatively in the up-down direction of the vehicle by the size $\Delta f$ of the front-side gap. A position where the claw part 52c contacts the upper surface 42b of the base plate 42 is a lower limit point, where the front linking piece 52 displaces downward relative to the stopper bracket 40. A position where the upper surface 52d of the upper part 52b contacts the base surface 45a of the front groove 45 is an upper limit point, where the front linking piece 52 displaces upward relative to the stopper bracket 40. The claw part 52c is permitted to displace relatively in the vehicle width direction within the range between the pair of extension plates 41 and 41 of the stopper bracket 40.

Figure 9:
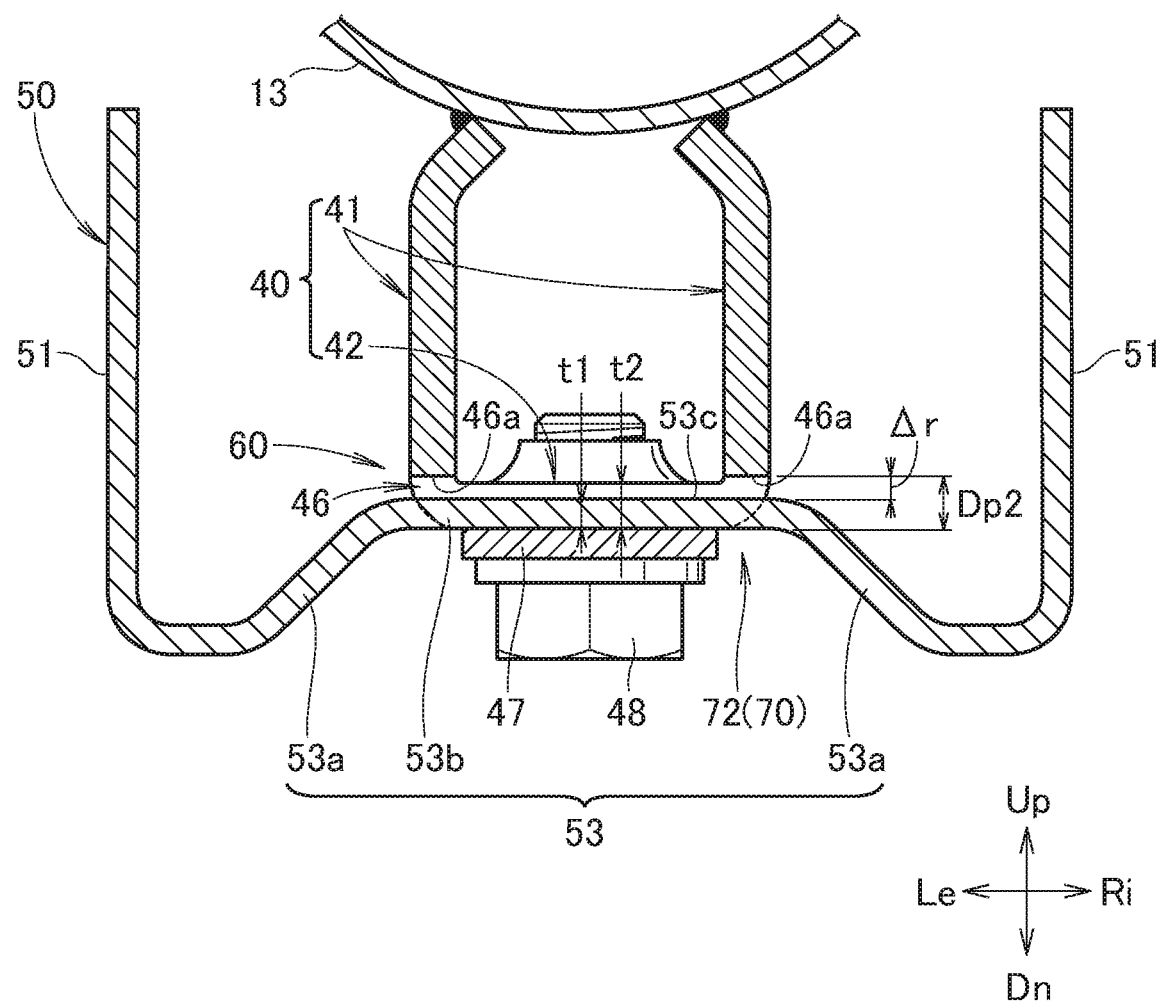
FIG. 9 is a cross-sectional view taken along a line 9-9 in FIG. 5.

As illustrated in FIGS. 4, 5, and 9, a stopping part 47 near the rear groove 46 is removably attached to a lower surface 42a of the base plate 42 of the stopper bracket 40, using a fixing member 48 such as a bolt. This stopping part 47 includes a flat plate extending along the base plate 42 so as to partially cover the rear groove 46. Accordingly, in a state where the rear linking piece 53 is fitted into the rear groove 46, the rear linking piece 53 will not fall out from the rear groove 46. The stopping part 47 can also be realized as a base plate of a harness support bracket 49 for supporting a wire harness (not illustrated), for example.

As illustrated in FIG. 9, in this state, a difference $\Delta r$ between a depth Dp2 of the rear groove 46 and a thickness t1 of the upper part 53b of the rear linking piece 53 will be called a "size difference $\Delta r$ of the rear-side gap" hereinafter. The rear linking piece 53 is permitted to displace relatively in the up-down direction of the vehicle by the size difference $\Delta r$ of the rear-side gap. A position where the lower surface of the upper part 53b contacts the stopping part 47 is a lower limit point, where the rear linking piece 53 displaces downward relative to the stopper bracket 40. A position where an upper surface 53c of the upper part 53b contacts a base surface 46a of the rear groove 46 is an upper limit point, where the rear linking piece 53 displaces upward relative to the stopper bracket 40. Thus, the rear linking piece 53 is permitted to displace relatively in the up-down direction of the vehicle between the base surface 46a of the rear groove 46 and the stopping part 47. The stopping part 47 is permitted to displace relatively in the vehicle width direction within a range corresponding to the length, in the vehicle width direction, of the upper part 52b of the rear linking piece 53.

As is clear from the foregoing descriptions, the length of the front and rear grooves 45 and 46 in the left-right direction corresponds to the width of the stopper bracket 40 in the left-right direction. The respective edges of the front and rear grooves 45 and 46 guide the relative displacement of the front and rear linking pieces 52 and 53 in both the vehicle width direction and the up-down direction. The front and rear grooves 45 and 46 guide the front and rear linking pieces 52 and 53 along their entire lengths in the left-right direction, and thus the hanger bracket 50 can be caused to displace relatively in the vehicle width direction and the up-down direction smoothly.

As illustrated in FIGS. 5, 8, and 9, the guide mechanism 60 includes the front and rear grooves 45 and 46 and the front and rear linking pieces 52 and 53. The guide mechanism 60 guides the hanger bracket 50 so as to restrict the hanger bracket 50 from displacing relative to the stopper bracket 40 in the front-rear direction of the vehicle and so that the hanger bracket 50 can displace relative to the stopper bracket 40 in the vehicle width direction. As such, the guide mechanism 60 can have a simple configuration, realized simply by combining the grooves 45 and 46 and the linking pieces 52 and 53.

Moreover, the claw part 52c formed integrally with the hanger bracket 50 is configured to simply rest on the upper surface 42b of the base plate 42, which makes it possible to position the minimum height of the hanger bracket 50 relative to the stopper bracket 40 and prevent the hanger bracket 50 from falling out. Additionally, the configuration in which the stopping part 47 is simply attached to the base plate 42 of the stopper bracket 40 also makes it possible to position the minimum height of the hanger bracket 50 relative to the stopper bracket 40 and prevent the hanger bracket 50 from falling out.

The support mechanism 70 includes a front support mechanism 71 and a rear support mechanism 72. The front support mechanism 71 includes the upper surface 42b of the base plate 42 and the base surface 45a of the front groove 45 in the stopper bracket 40, and the front linking piece 52 and the claw part 52c of the hanger bracket 50. The rear support mechanism 72 includes the base surface 46a of the rear groove 46 in the stopper bracket 40, the rear linking piece 53 of the hanger bracket 50, and the stopping part 47. The support mechanism 70 supports the hanger bracket 50 while permitting the hanger bracket 50 to displace in the up-down direction of the vehicle relative to the stopper bracket 40 within a pre-set constant range, i.e., supports the hanger bracket 50 in a floating manner.

As is clear from the foregoing descriptions, referring to FIGS. 5 to 9, the rear support mechanism 72 in the support mechanism 70 includes: the groove 46 (the rear groove 46), which is located in the lower surface 42a of the stopper bracket 40 and penetrates in the vehicle width direction; a fitting piece 53 (the rear linking piece 53) of the hanger bracket 50, which can be fitted with the groove 46 so as to be capable of displacing relative thereto in the vehicle width direction and restricted from displacing relative thereto in the front-rear direction of the vehicle; and a retaining part 47 (the stopping part 47). Thus, the rear support mechanism 72 includes the retaining part 47, which retains a state of the hanger bracket 50 being restricted from displacing relative to the stopper bracket 40 in the front-rear direction of the vehicle using the guide mechanism 60.

Accordingly, a state in which the hanger bracket 50 is restricted from displacing in the front-rear direction of the vehicle relative to the stopper bracket 40 can be retained by the retaining part 47. Thus, collision energy produced by a secondary collision can be sufficiently transmitted from the stopper bracket 40 to the hanger bracket 50. The hanger bracket 50 sufficiently receiving the collision energy allows for a desired amount of energy absorption to be maintained.

Here, depths Dp1 and Dp2 of the front and rear grooves 45 and 46 are set so that the functions of the guide mechanism 60 and the support mechanism 70 can be reliably realized. In other words, relative to the stopper bracket 40, the hanger bracket 50 (1) can be guided so as to be restricted from relatively displacing in the front-rear direction of the vehicle and capable of relatively displacing in the vehicle width direction, and (2) can be supported while permitting relative displacement in the up-down direction of the vehicle within a pre-set constant range. The depths Dp1 and Dp2 are preferably set to at least the same size as a thickness t2 of the base plate 42.

In this manner, the steering apparatus 10 includes the guide mechanism 60 and the support mechanism 70, and thus when the hanger bracket 50 is assembled with the stopper bracket 40, the position of the hanger bracket 50 relative to the stopper bracket 40 can be automatically adjusted up, down, left, and right. In a case where the stopper bracket 40 is fixed to the inner pipe by welding or the like, for example, thermal strain can arise. Further, various parts of the steering apparatus 10 may have dimensional tolerances. Even in this case, the position of the hanger bracket 50 relative to the stopper bracket 40 is automatically adjusted up, down, left, and right, and thus thermal strain or tolerances can be compensated for. Thus, the hanger bracket 50 can easily be assembled with the stopper bracket 40.

Moreover, both the guide mechanism 60 and the support mechanism 70 are constituted primarily by the combined structures of the front and rear grooves 45 and 46 and the front and rear linking pieces 52 and 53. The guide mechanism 60 and the support mechanism 70 can therefore have a simple configuration.

Furthermore, the hanger bracket 50 is supported in a floating state, and capable of displacing in the vehicle width direction, relative to the stopper bracket 40. In other words, the hanger bracket 50 is not bolted to the stopper bracket 40. When the clamp bolt 31 is tightened, the hanger bracket 50 does not push out against the stopper bracket 40. Additionally, a case where when only the side plates 51 tilt, the edges of the telescopic adjustment long holes 54 tilt along with the side plates 51 and rub against the outer circumferential surface of the clamp bolt 31, called a "rubbing phenomenon", can be prevented as well. In this manner, resistance to the operation of tightening the clamp bolt 31 can be reduced. Accordingly, the tightening force applied to tighten the clamp bolt 31 is not dampened due to the brackets 40 and 50 being bolted to each other. As such, the tightening force applied to tighten the pair of side plates 51 and 51 can be further increased by the pair of clamp parts 23 and 23 and the pair of outer column support parts 11a and 11a. Increasing friction at both surfaces of the pair of side plates 51 and 51 further ensures sufficient stable collision energy absorption performance.

Moreover, dampening of the tightening force when tightening the clamp bolt 31 can be suppressed to a high degree. Thus, when tightening the clamp bolt 31, the tightening operation can be made easier.

As illustrated in FIG. 3, in the restricted mode, where the operating lever 33 has been switched to the restricted position P2 (see FIG. 1), the pair of side plates 51 and 51 are tightened by the pair of outer column support parts 11a and 11a and the pair of clamp parts 23 and 23. Accordingly, collision energy produced by a secondary collision can be absorbed by friction between the pair of outer column support parts 11a and 11a and the pair of side plates 51 and 51, and friction between the outer column 12 and the inner pipe 13.

Several variations on the steering apparatus 10 illustrated in FIG. 1 will be described next. Note that the basic configurations are the same as in the steering apparatus 10 illustrated in FIGS. 1 to 9. Identical configurations are assigned identical reference signs, and descriptions thereof will be omitted. The variations achieve effects similar to those of the steering apparatus 10 illustrated in FIGS. 1 to 9.

First Variation

Figure 10:
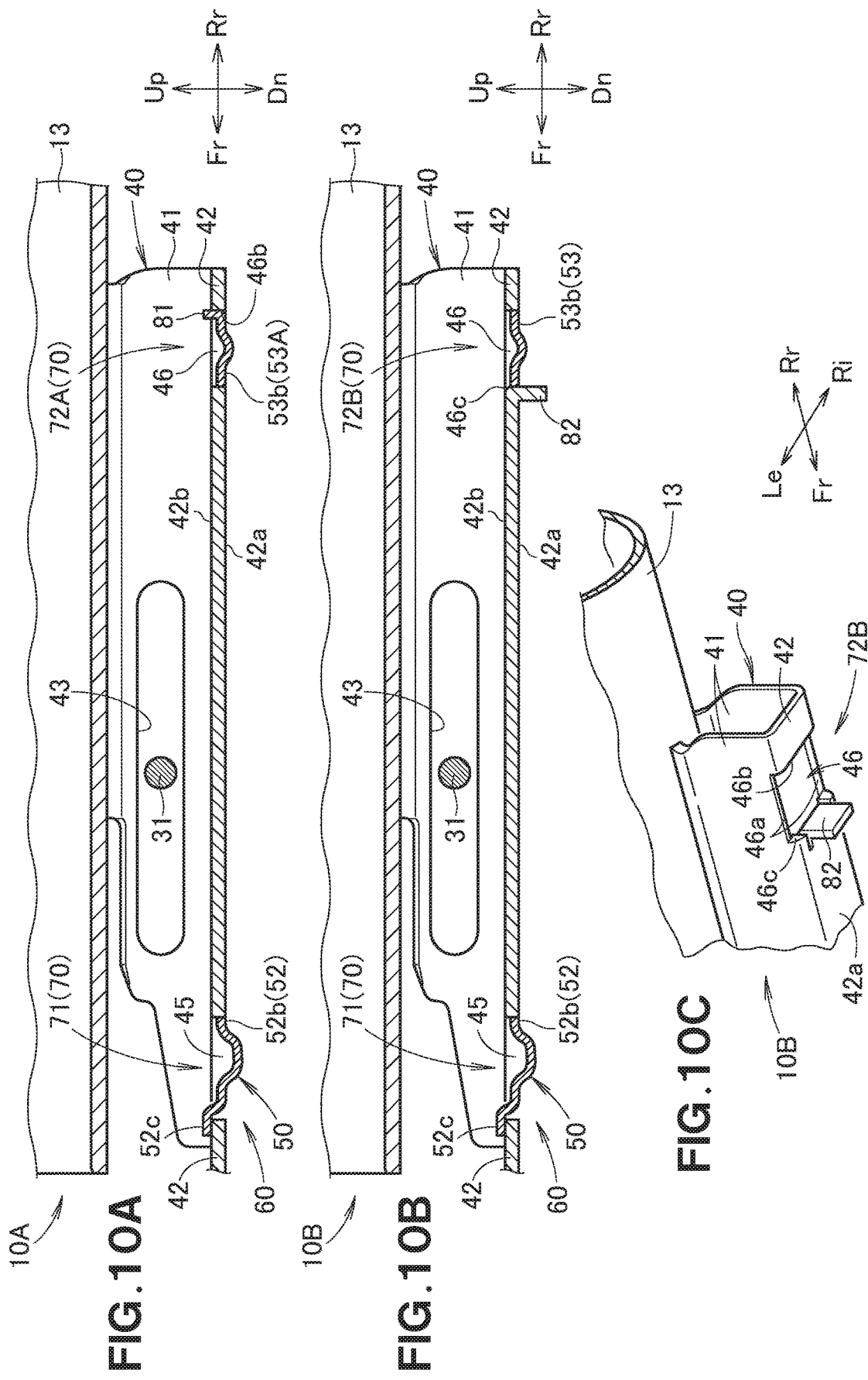
FIGS. 10A to 10C are schematic diagrams illustrating a steering apparatus according to first and second variations of the embodiment.

A steering apparatus 10A according to a first variation will be described with reference to FIG. 10A. FIG. 10A illustrates a combined structure of the stopper bracket 40 and the hanger bracket 50 in the steering apparatus 10A according to the first variation, and corresponds to the above-described FIG. 5.

In the steering apparatus 10A of the first variation, the rear support mechanism 72 illustrated in FIG. 5 is replaced with a rear support mechanism 72A illustrated in FIG. 10A. To be more specific, the variation makes the following two changes. The first change is that the stopping part 47 illustrated in FIG. 5 is removed. The second change is that the rear linking piece 53 of the hanger bracket 50, illustrated in FIG. 5 is replaced with a rear linking piece 53A illustrated in FIG. 10A.

The rear linking piece 53A of the first variation includes a flange part 81 extending upward from the rear end of the upper part 53b (see also FIGS. 4 and 7). An upper end of the flange part 81 is located higher than the base plate 42 of the stopper bracket 40. The stopping part 47 illustrated in FIG. 5 is removed, and thus the hanger bracket 50 tends to rotate downward about the claw part 52c. A rotational trajectory over which the upper end of the flange part 81 descends at this time overlaps with a rear edge 46b of the rear groove 46 with respect to the front-rear direction of the vehicle. Thus, the rear linking piece 53A does not fall out from the rear groove 46. Removing the stopping part 47 illustrated in FIG. 5 makes it possible to reduce the number of components.

As is clear from the foregoing descriptions, in the first variation, the rear support mechanism 72A in the support mechanism 70 includes: the groove 46 (the rear groove 46), which is located in the lower surface 42a of the stopper bracket 40 and penetrates in the vehicle width direction; a fitting piece 53A (the rear linking piece 53A) of the hanger bracket 50, which can be fitted with the groove 46 so as to be capable of displacing relative thereto in the vehicle width direction and restricted from displacing relative thereto in the front-rear direction of the vehicle; and a retaining part 81. The retaining part 81 includes the flange part 81, which extends upward from the rear end of the fitting piece 53A. Thus, the rear support mechanism 72A includes the retaining part 81, which retains a state of the hanger bracket 50 being restricted from displacing relative to the stopper bracket 40 in the front-rear direction of the vehicle using the guide mechanism 60.

Accordingly, a state in which the hanger bracket 50 is restricted from displacing in the front-rear direction of the vehicle relative to the stopper bracket 40 can be retained by the retaining part 81. Thus, collision energy produced by a secondary collision can be received by the hanger bracket 50, and thus a desired amount of energy absorption can be maintained. Moreover, the retaining part 81 can be configured easily, by the flange part 81 extending upward from the rear end of the fitting piece 53A of the hanger bracket 50.

Second Variation

A steering apparatus 10B according to a second variation will be described with reference to FIGS. 10B and 10C. FIG. 10B illustrates a combined structure of the stopper bracket 40 and the hanger bracket 50 in the steering apparatus 10B according to the second variation, and corresponds to the above-described FIG. 10A. FIG. 10C illustrates a rear part of the stopper bracket 40 of FIG. 10B.

In the steering apparatus 10B of the second variation, the rear support mechanism 72A illustrated in FIG. 10A is replaced with a rear support mechanism 72B illustrated in FIGS. 10B and 10C. To be more specific, the variation makes the following two changes. The first change is that the flange part 81 illustrated in FIG. 10A is removed. The second change is that a flange part 82 extending downward from a front edge 46c of the rear groove 46 is provided. A lower end of the flange part 82 is located lower than the base plate 42 of the stopper bracket 40.

The stopping part 47 illustrated in FIG. 5 is removed, and thus the hanger bracket 50 tends to rotate downward about the claw part 52c. A rotational trajectory over which the front edge of the upper part 53b descends at this time overlaps with the flange part 82 with respect to the front-rear direction of the vehicle. Thus, the upper part 53b does not fall out from the rear groove 46. Removing the stopping part 47 illustrated in FIG. 5 makes it possible to reduce the number of components.

As is clear from the foregoing descriptions, in the second variation, the rear support mechanism 72B in the support mechanism 70 includes: the groove 46 (the rear groove 46), which is located in the lower surface 42a of the stopper bracket 40 and penetrates in the vehicle width direction; a fitting piece 53 (the rear linking piece 53) of the hanger bracket 50, which can be fitted with the groove 46 so as to be capable of displacing relative thereto in the vehicle width direction and restricted from displacing relative thereto in the front-rear direction of the vehicle; and a retaining part 82. The retaining part 82 includes the flange part 82, which extends downward from the front edge 46c of the groove 46. Thus, the rear support mechanism 72B includes the retaining part 82, which retains a state of the hanger bracket 50 being restricted from displacing relative to the stopper bracket 40 in the front-rear direction of the vehicle using the guide mechanism 60.

Accordingly, a state in which the hanger bracket 50 is restricted from displacing in the front-rear direction of the vehicle relative to the stopper bracket 40 can be retained by the retaining part 82. Thus, collision energy produced by a secondary collision can be received by the hanger bracket 50, and thus a desired amount of energy absorption can be maintained. Moreover, the retaining part 82 can be configured easily, by the flange part 82 that extends downward from the front edge 46c of the groove 46, which is located in the lower surface 42a of the stopper bracket 40 and penetrates in the vehicle width direction.

Third Variation

A steering apparatus 10C according to a third variation will be described with reference to FIG. 11. FIG. 11 illustrates a combined structure of the stopper bracket 40 and the hanger bracket 50 in the steering apparatus 10C according to the third variation, and corresponds to the above-described FIG. 3.

In the steering apparatus 10C of the third variation, two pairs of friction plates 91 and 92 are provided receptively to the pair of side plates 51 and 51 of the hanger bracket 50. The pair of friction plates 91 and 92 being provided one on each side of the pair of side plates 51 and 51. This makes it possible to increase the friction further, and thus the performance of absorbing collision energy produced by a secondary collision can be improved further by absorbing such energy using friction. Note that a pair of friction plates 91 may be provided only on the outside surfaces of the pair of side plates 51 and 51 with respect to the vehicle width direction.

The embodiment can be applied in various types of steering apparatuses. For example, the present invention can be applied in a type of steering apparatus in which the outer column 12 can be separated from the vehicle body by collision energy produced in a secondary collision. The embodiment can also be applied in a type of steering apparatus in which a friction-adding pipe is held within the inner pipe 13 by friction, and the steering shaft is disposed within the friction-adding pipe. In this case, the stopper bracket 40 may be fixed to the friction-adding pipe. Providing long holes in the inner pipe 13 so that the stopper bracket 40 can protrude outward in the radial direction makes it possible to avoid interference between these two elements. A tilt adjustment mechanism is not a required part of the embodiment.

The front and rear linking pieces 52 and 53 illustrated in FIG. 4 may have any configuration that connects the front ends and rear ends of the pair of side plates 51 and 51 to each other, and may only include the upper parts 52b and 53b, for example.

Furthermore, the front support mechanism 71 may have the same configuration as the rear support mechanism 72, or the rear support mechanism 72 may have the same configuration as the front support mechanism 71.

INDUSTRIAL APPLICABILITY

The steering apparatuses 10 and 10A to 10C of the embodiment can be usefully employed in passenger vehicle steering systems.

DESCRIPTION OF REFERENCE SIGNS

10 Steering apparatus
10A Steering apparatus
10B Steering apparatus
10C Steering apparatus
11 Vehicle body attachment bracket
11a Outer column support part
12 Outer column
13 Inner pipe
14 Steering shaft
23 Clamp part
30 Fastening mechanism
31 Clamp bolt
40 Stopper bracket
42a Lower surface
46 Rear groove
46c Front edge of rear groove
47 Retaining part (stopping part)
50 Hanger bracket
51 Side plate
53 Fitting piece (rear linking piece)
53A Fitting piece (rear linking piece)
54 Telescopic adjustment long hole
60 Guide mechanism
70 Support mechanism
72 Rear support mechanism
72A Rear support mechanism
72B Rear support mechanism
81 Retaining part (flange part)
82 Retaining part (flange part)

What is claimed is:

1. A steering apparatus comprising:
   an inner pipe rotatably supporting a steering shaft, the steering shaft being disposed within the inner pipe;
   an outer column including a pair of clamp parts holding the inner pipe such that the inner pipe can move in a front-rear direction of a vehicle and can be fixed;
   a vehicle body attachment bracket including a pair of outer column support parts that enclose the pair of clamp parts from both sides in a width direction, the vehicle body attachment bracket being attachable to a vehicle body;
   a fastening mechanism including a clamp bolt capable of tightening the inner pipe through the pair of clamp parts and the pair of outer column support parts;
   a stopper bracket fixed to the inner pipe and located between the pair of clamp parts; and
   a hanger bracket capable of being assembled onto a lower end of the stopper bracket,
   wherein the hanger bracket includes a pair of side plates, a telescopic adjustment long hole being formed in each of the pair of side plates;
   the pair of side plates are interposed between the pair of clamp parts and the pair of outer column support parts, and
   the steering apparatus further includes:
   a guide mechanism configured to guide the hanger bracket such that the hanger bracket is restricted from displacing relative to the stopper bracket in the front-rear direction of the vehicle and is capable of displacing relative to the stopper bracket in a vehicle width direction; and
   a support mechanism configured to support the hanger bracket relative to the stopper bracket.

2. The steering apparatus according to claim 1,
   wherein the support mechanism includes a retaining part configured to retain a state of the hanger bracket being restricted from displacing relative to the stopper bracket in the front-rear direction of the vehicle using the guide mechanism.

3. The steering apparatus according to claim 2,
   wherein the support mechanism includes:
   a groove located in a lower surface of the stopper bracket and penetrating in the vehicle width direction;
   a fitting piece of the hanger bracket, the fitting piece being capable of fitting with the groove to be capable of relative displacement in the vehicle width direction and restricted from relative displacement in the front-rear direction of the vehicle; and
   the retaining part,
   the retaining part including a flange part extending upward from a rear end of the fitting piece.

4. The steering apparatus according to claim 2,
wherein the support mechanism includes:
a groove located in a lower surface of the stopper bracket and penetrating in the vehicle width direction;
a fitting piece of the hanger bracket, the fitting piece being capable of fitting with the groove to be capable of relative displacement in the vehicle width direction and restricted from relative displacement in the front-rear direction of the vehicle; and
the retaining part,
the retaining part including a flange part extending downward from a front edge of the groove.

\* \* \* \* \*